3,105,056
RUST-PREVENTING COATING COMPOSITION
Takeichi Oshima, 136 Idogaya-Nakamachi, Minamiku, and Yukichi Uyemura, 420 Otamachi 4-chome, both of Yokohama, Japan
No Drawing. Filed Apr. 19, 1960, Ser. No. 23,154
Claims priority, application Japan Apr. 20, 1959
4 Claims. (Cl. 260—32.8)

At present, various kinds of coating compositions are used for preventing or retarding rust formation on surfaces of articles made of iron and steel. Most of these compositions consist of a coating vehicle and a finely divided metallic powder such as of zinc, aluminum and of alloys such as imitation gold (aluminum gold). This metallic powder contained in the coating composition, when it is stored or when it is exposed to a damp atmosphere, soon loses its proper metallic color or luster due to the detrimental effect of a minute amount of acidity or alkalinity present in the vehicle of the composition or produced by the action of free oxygen and carbon dioxide in a damp atmosphere. To overcome such disadvantages, the vehicle and the metallic powder are provided separately, and these materials are mixed in situ to form a finished composition when it is used. Such, however, is very troublesome for consumers, and there has long been a need for a storable coating composition which previously contains metallic powder and is ready for use.

It has been found that an improved rust-preventing coating composition containing finely divided metallic powder, which produces a level coating with a single or double application without any primary coating, the coating thus obtained showing a beautiful appearance of metal and excellent resistance against water and severe weather as well as high temperature, is obtained when a slightly wet mass consisting of zinc hydroxide and ammonium chloride, a metal powder such as a powder of aluminum, zinc and an alloy of golden appearance, a metal salt such as a heavy metal salt of boric acid and/or one or more metallic oxides are intimately mixed with an organic solution of vinyl chloride-vinylidene chloride copolymer.

Accordingly, the present invention aims to provide an improved rust-preventing coating composition and a process for producing the same.

The specified coating composition according to the present invention may be produced by blending a mixture of zinc hydroxide and ammonium chloride, which mixture is prepared by adding aqueous ammonia to an aqueous solution of zinc chloride and drying the whole to a slightly moistened mass, with a finely divided metallic powder and a metal salt such as a heavy metal salt of boric acid, milling the mass on a roll to produce an intimate mixture, thoroughly mixing the mixture thus obtained with a solution of vinyl chloride-vinylidene chloride copolymer in an organic solvent such as methyl ethyl ketone, acetone, butanol, toluene or the like, and filtering through a percolator to obtain a homogeneous dispersion product. In the mixture of zinc hydroxide and ammonium chloride above used, the zinc hydroxide exists in a form of gel which behaves amphoterically according to the following equation:

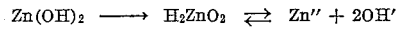
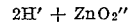

Due to the presence of this particular substance, the coating composition according to the present invention, is in an almost neutral state of pH value 7–8 and so the luster of metallic powder contained therein may be retained unchanged for a long time of storage.

As compared with the known standard rust-preventing paint commercially available, a superior result was obtained with the coating composition according to the present invention in regard to the rust-preventing property. The test was carried out by dipping the test pieces each consisting of an iron plate coated with each individual composition in a 5% aqueous sodium chloride solution.

In the test, rust formation was clearly visible on the test piece treated with the known product after 4 days' dipping, while with the composition according to the present invention, no rust formation could be seen even after 100 days' continuous dipping.

Since there was no appreciable deterioration of the coating produced with the coating composition of the present invention when the same was exposed to 200° C. for 20 hours and to 300° C. for 50 hours respectively, it is apparent that the coating has a remarkable refractory property. The coating composition according to the invention may suitably be used as a coating of the parts to be heated in use such as steam radiators and exhaust systems of heating devices.

The coating composition of the invention is widely used for the coating of outdoor equipment made of iron such as gasoline storage vessels, electric poles, iron-framed constructions and the like which would be exposed for a long time to sunlight and especially heated in summer to an injurious high temperature. There is no deterioration of the coating caused by such undesired temperature elevation.

The following examples are for the sake of more fully understanding the invention, the preparation of the compositions and test results of the coatings obtained therefrom being referred to:

EXAMPLE 1

100 g. of zinc chloride is introduced into a 10% aqueous ammonia and the reaction mixture which contains a white precipitate is evaporated to a mass containing about 5–8% of water. 5 g. of this substance, 30 g. of a finely divided metal, 5 g. of calcium borate and 5 g. of antimony oxide are introduced while stirring into a solution of 3 g. of copolymer of vinyl chloride and vinylidene chloride in 27 g. of a mixed solvent consisting of 60% of methyl ethyl ketone, 10% of butanol and 30% of toluene, and the whole is first ground in a grinding mill and worked on rolls. It is finally percolated through a vibrating percolator driven by an electric motor to obtain a product having a paint-like nature.

A similar result is obtained when a mixture of 2.4 g. of zinc hydroxide and 2.6 g. of ammonium chloride is used instead of the zinc chloride and the aqueous ammonia in the above example.

EXAMPLE 2

The procedure is similar to that mentioned in Example 1 with the exception of the following quantities of raw materials:

| | G. |
|---|---|
| Zinc hydroxide | 2.4 |
| Ammonium chloride | 2.6 |
| Heavy metal borate | 1.0 |
| Antimony oxide | 4.0 |
| Metallic powder | 60 |
| Copolymer of vinyl chloride and vinylidene chloride | 3.0 |
| Solvent | 27 |

The coating compositions obtained in Examples 1 and 2 are paint-like fluids and show a proper color and luster of the metal powder used.

The products can be applied on the surfaces of the iron parts to be coated by means of brush or spray-gun with good extensibility and there are thereby obtained fast adherent coatings.

The results of tests for fastness of the coating produced with the coating composition according to the present invention are as follows:

(a) Refractory Test

No change was visible after 20 hours' heating at 300° C.

(b) Saline Water Spraying Test

The test was carried with a 5% aqueous solution of common salt of pH 6.6–7.0 at a temperature of 55±1° C., a spraying pressure of 16±0.5 lb./in.$^2$ and a mean value taken of 0.7–1.5 cc. (180 cm.$^2$/hr.). No appreciable change was observed in the coating.

What we claim is:

1. A rust-preventing and refractory coating composition consisting essentially of a mixture of approximately 2.4 parts by weight of zinc hydroxide, approximately 2.6 parts by weight of ammonium chloride, approximately 1.0 part by weight of calcium borate, approximately 4.0 parts by weight of antimony oxide, approximately 60 parts by weight of metallic powder selected from the group consisting of zinc powder and aluminum powder, approximately 3.0 parts by weight of vinyl chloride-vinylidene chloride copolymer, and approximately 27 parts by weight of an organic solvent for said copolymer, said solvent being selected from the group consisting of acetone, methyl ethyl ketone, butanol and toluene.

2. A rust-preventing coating composition consisting essentially of a mixture of approximately 2.4 parts by weight of zinc hydroxide, approximately 2.6 parts by weight of ammonium chloride, approximately 1.0 part by weight of calcium borate, approximately 4.0 parts by weight of antimony oxide, approximately 60 parts by weight of a metallic powder selected from the group consisting of aluminum powder and zinc powder, approximately 3.0 parts by weight of vinyl chloride-vinylidene chloride copolymer, and approximately 27 parts by weight of an organic solvent consisting of a mixture of methyl ethyl ketone, butanol and toluene.

3. A rust-preventing coating composition consisting essentially of a mixture of approximately 2.4 parts by weight of zinc hydroxide, approximately 2.6 parts by weight of ammonium chloride, approximately 1.0 part by weight of calcium borate, approximately 4.0 parts by weight of antimony oxide, approximately 60 parts by weight of aluminum powder, approximately 3.0 parts by weight of vinyl chloride-vinylidene chloride copolymer, and approximately 27 parts by weight of an organic solvent consisting of a mixture of methyl ethyl ketone, butanol and toluene.

4. A rust-preventing coating composition consisting essentially of a mixture of approximately 2.4 parts by weight of zinc hydroxide, approximately 2.6 parts by weight of ammonium chloride, approximately 1.0 part by weight of calcium borate, approximately 4.0 parts by weight of antimony oxide, approximately 60 parts by weight of zinc powder, approximately 3.0 parts by weight of vinyl chloride-vinylidene chloride copolymer, and approximately 27 parts by weight of an organic solvent consisting of a mixture of methyl ethyl ketone, butanol and toluene.

References Cited in the file of this patent

UNITED STATES PATENTS

| | | |
|---|---|---|
| 2,167,278 | Leatherman | July 25, 1939 |
| 2,402,075 | Novotny et al. | June 11, 1946 |
| 2,591,368 | McCarthy | Apr. 1, 1952 |
| 2,860,118 | Nagelschmidt et al. | Nov. 11, 1958 |
| 2,933,400 | Wurbs et al. | Apr. 19, 1960 |
| 2,944,919 | Morris et al. | July 12, 1960 |
| 2,978,424 | Atwood et al. | Apr. 4, 1961 |

OTHER REFERENCES

Von Fischer et al.: "Organic Protective Coatings," Reinhold Publishing Corp., New York (1953), page 170.